INVENTORS.
John R. Moyer
Marshall P. Neipert
BY
Stephen A. Grace
ATTORNEY

United States Patent Office 3,799,749
Patented Mar. 26, 1974

3,799,749
METHOD OF PURIFYING NaOH SOLUTIONS
John R. Moyer, Midland, Mich., and Marshall P. Neipert, Lake Jackson, Tex., assignors to The Dow Chemical Company, Midland, Mich.
Continuation-in-part of application Ser. No. 876,698, Nov. 14, 1969. This application July 19, 1971, Ser. No. 163,888
Int. Cl. B01d 9/02
U.S. Cl. 23—302        16 Claims

ABSTRACT OF THE DISCLOSURE

A method of removing impurities from NaOH solutions which comprises: cooling the NaOH solution to supersaturate with respect to a NaOH hydrate; forming a slurry of NaOH hydrate and impurity crystals from the supersaturated solution; countercurrently contacting the slurry with a classification solution such that the impurity crystals are carried with the classification solution, leaving the NaOH hydrate crystals behind; and after removal of the impurity crystals, recycling the solution with make up NaOH solution to the cooling stage. The NaOH hydrate crystals so produced can be washed and melted to produce high purity NaOH.

---

This application is a continuation-in-part of Ser. No. 876,698, filed Nov. 14, 1969.

BACKGROUND OF THE INVENTION

To a large extent current supplies of sodium hydroxide are derived as a by-product of chlorine production. For example, an aqueous NaCl solution is electrolyzed to $Cl_2$ and NaOH solution. The NaOH solution is then processed to commercially useable concentrations, e.g. 50% or above.

Basically there are two types of electrolytic cells used in the production of $Cl_2$—the diaphragm cell and the mercury cell. While operation of the diaphragm cell is quite economical, the NaOH by-product effluent from such cell contains considerable impurities, particularly NaCl. A typical diaphragm cell effluent is about 8–10% NaOH and 15% NaCl. The cell effluent is normally concentrated by evaporation, but even at 50% NaOH, the solution still contains about 1–2% NaCl. The mercury cell, although more expensive to operate, produces a NaOH solution having on the order of 0.01 to 0.001% NaCl.

It is a primary object of the present invention to provide a method of producing a NaOH product from diaphragm cell effluent or the like which has a purity level equaling or approaching that of the mercury cell product.

Several methods have been proposed to purify NaOH solutions containing impurities which become insoluble on concentrating NaOH, e.g. NaCl. U.S. 2,127,496 (Waldeck) discloses a method in which a 42–52% NaOH solution is cooled to form large $NaOH \cdot 2H_2O$ crystals and smaller NaCl crystals. The dihydrate crystals are separated by filtration. These dihydrate crystals can be remelted to produce, e.g. 50% NaOH with NaCl impurity of less than 1%. U.S. 2,178,694 (Muskat et al.) uses a similar technique to coprecipitate and separate large $NaOH \cdot H_2O$ from smaller NaCl crystals. The resultant NaOH solution contains on the order of 0.1–0.5% NaCl impurity. Such methods suffer from the fact that the NaOH hydrate crystals are filtered with, as well as from, the NaCl crystals. Therefore, inherently some of the NaCl crystals are adsorbed on or cling to the NaOH hydrate crystals. Subsequent washing steps remove the soluble impurities, but the insoluble ones dissolve only slowly and remain as an impurity in the remelted NaOH solution.

A still further object of the present invention is to provide a method of separating the NaOH hydrate crystals from the impurity crystals without attendant surface adsorption of solid impurities.

The term "NaOH solution containing insoluble impurity," as used herein, refers to any aqueous solution of NaOH containing one or more impurities which upon concentration of the NaOH solution will become insoluble and precipitate out of solution, e.g. NaCl, $NaSO_4$, $Na_2SiO_3$, $Na_2CO_3$, $Ca(OH)_2$, $Mg(OH)_2$.

THE INVENTION

The present method comprises coprecipitating NaOH hydrate crystals, e.g. $NaOH \cdot 2H_2O$, and insoluble impurity crystals, e.g. NaCl, and separating or classifying these crystals in such a manner as to permit recovery of NaOH hydrate of a purity approaching that of mercury cell NaOH. A NaOH solution containing insoluble impurity, e.g. concentrated diaphragm cell effluent, is cooled to a temperature where the solution is supersaturated with respect to a NaOH hydrate. From the supersaturated solution a slurry of large crystals of the NaOH hydrate, and because they nucleate spontaneously, fine crystals of the insoluble impurity crystals is formed, for example, by contacting the supersaturated solution with seed crystals of the same NaOH hydrate in an agitated crystallizer. The large NaOH hydrate crystals are separated from the smaller impurity crystals by countercurrently contacting the slurry with a classification solution, e.g. water or a NaOH solution, such that the fine impurity crystals are carried out with the classification solution, while the large NaOH hydrate crystals settle to form a crystal bed. It is critical that there is no substantial settling of the mixed crystal slurry prior to contact with the classification solution, since, as previously noted, substantial contact between the NaOH hydrate and the impurity crystals have hampered prior art methods of separation. The classification solution containing the impurity crystals is separated from the NaOH hydrate crystal bed. The impurity crystals and any NaOH hydrate crystal fines which, due to their small size, may also have been carried by the classification solution, are removed, e.g. by filtration or centrifugation. The classification solution thus clarified, after addition of NaOH solution, can be recycled to the cooling stage. The removal of solids from the classification solution is also a critical step in the present process since it removes nucleation sites for NaOH hydrate formation upon cooling of recycled classification solution containing NaOH solution make-up. The NaOH crystals are removed and separated from residual mother liquor by, e.g. centrifugation or filtration. The hydrate crystals are then washed and melted to produce, e.g. a 50% NaOH solution of relatively high purity.

Although the present method is particularly adapted to purify diaphragm cell effluent, such process can be utilized to upgrade other NaOH solutions containing impurities which are soluble initially but which become insoluble as the NaOH hydrate precipitates.

In the practice of the present invention the caustic solution containing insoluble impurity is cooled to a point of supersaturation with respect to a NaOH hydrate, i.e. a metastable solution in which the dissolved NaOH hydrate exceeds the amount that the solution can hold under equilibrium conditions. The cooling is accomplished by use of conventional heat exchanger equipment or by direct contact of the NaOH solution with a liquid refrigerant, e.g. Freon or butane. In the latter embodiment the release of heat of vaporization cools the NaOH solution to the desired temperature, the refrigerant being removed as a gas. The initial NaOH concentration determines the particular NaOH hydrate which will precipitate. Below is a list of the known NaOH hydrates, the NaOH concentration range and the temperature at which the hydrate forms.

| NaOH hydrate | NaOH conc., wt. percent | Temp., °C. |
|---|---|---|
| NaOH·(anhy.) | 74 | 65 to 128. |
| NaOH·H$_2$O | 52 to 69 | 12 to 65. |
| NaOH·2H$_2$O | 45 to 52 | 5 to 12. |
| NaOH·3½ H$_2$O | 33 to 45 | 5 to 16. |
| NaOH·4H$_2$O | 25 to 33 | −18 to 5. |
| NaOH·5H$_2$O | 22 to 33 | −24 to −18. |
| NaOH·7H$_2$O | 18 to 22 | −28 to −24. |

The term "NaOH hydrate" as used herein refers to all of the above hydrates including anhydrous NaOH.

A slurry of NaOH hydrate and impurity crystals is formed from the supersaturated solution, for example, by feeding the solution into a crystallization zone. e.g. a conventional crystallizer, and contacting it with NaOH hydrate seed crystals at a temperature still below the saturation point of the NaOH hydrate. The crystals serve as nucleation sites for the formation of relatively heavy, large. e.g. 0.1 inches in diameter, NaOH hydrate crystals from the supersaturated solution. The insoluble impurity also crystallizes out of solution but with smaller particle size, e.g. 0.0001 inch (2.5 microns) in diameter, and lower weight. It is therefore recognized that these crystals possess differing settling rates—the NaOH hydrate crystals settling faster than the insoluble impurity despite their lower specific gravity.

Preferably, the solution is agitated during contact with the seed crystals, e.g. mechanical agitator in the crystallization zone. The agitation not only enhances the size to which the NaOH hydrate crystals grow but prevents the inclusion of impurities in the NaOH hydrate crystals. In a particular embodiment of the present method the formation of the slurry and the separation of the NaOH hydrate and impurity crystals are carried out in a single chamber. The slurry passes from the crystallization zone upward through a quiescent, unstirred, separation zone, e.g. at the top of the crystallizer, which allows the large NaOH hydrate crystals to settle back into the agitated region. The supersaturated solution is fed into and through the crystallizer at a controlled rate such that the insoluble impurity crystals are buoyed up and carried upwards with the solution as it passes through the quiescent zone, but the NaOH hydrate crystals are left to settle into the stirred zone to form a crystal bed. Thus, in this embodiment the supersaturated solution serves as the classification solution.

Alternatively, the slurry formed in the crystallization chamber is removed and fed into a counter-current wash column arrangement where it is contacted with a classification solution of water or NaOH solution. The rates at which the slurry and classification solution are fed into the column are such that the small impurity crystals are carried with the classification solution while the large NaOH hydrate crystals settle out.

If the NaOH solution is cooled by contact with a refrigerant, such contact can take place in the crystallization chamber, thereby incorporating cooling, slurry formation and optionally separation in one vessel.

The classification solution containing impurity crystals is withdrawn from the separation zone of the crystallizer or from the wash column and the impurity crystals removed.

The classification solution is mixed with make-up NaOH solutions and recycled. Such make-up solution can be added before or after the depleted solution is filtered.

Filtration of the classification solution is necessary to remove the impurity crystals so that they do not provide nucleation sites for future growth of impurity crystals during cooling of solution to supersaturation.

The classification solution may also contain NaOH hydrate fines, i.e. crystals which because of their size are carried with the solution. These can also be removed by filtration or alternatively the classification solution can be heated to melt the NaOH hydrate fines. This avoids premature NaOH hydrate crystal formation during subsequent cooling of the solution.

The NaOH hydrate crystals are removed from the crystallizer chamber or wash column and separated from any adhering mother liquor by centrifugation or the like. The mother liquor can be recycled to the classification solution. The crystals are washed in H$_2$O or preferably NaOH solution. The crystals can then be melted to produce a high purity caustic solution.

PREFERRED EMBODIMENT

The present process is preferably carried out using concentrated diaphragm cell effluent under conditions which produce NaOH·2H$_2$O crystals.

Figure 1:
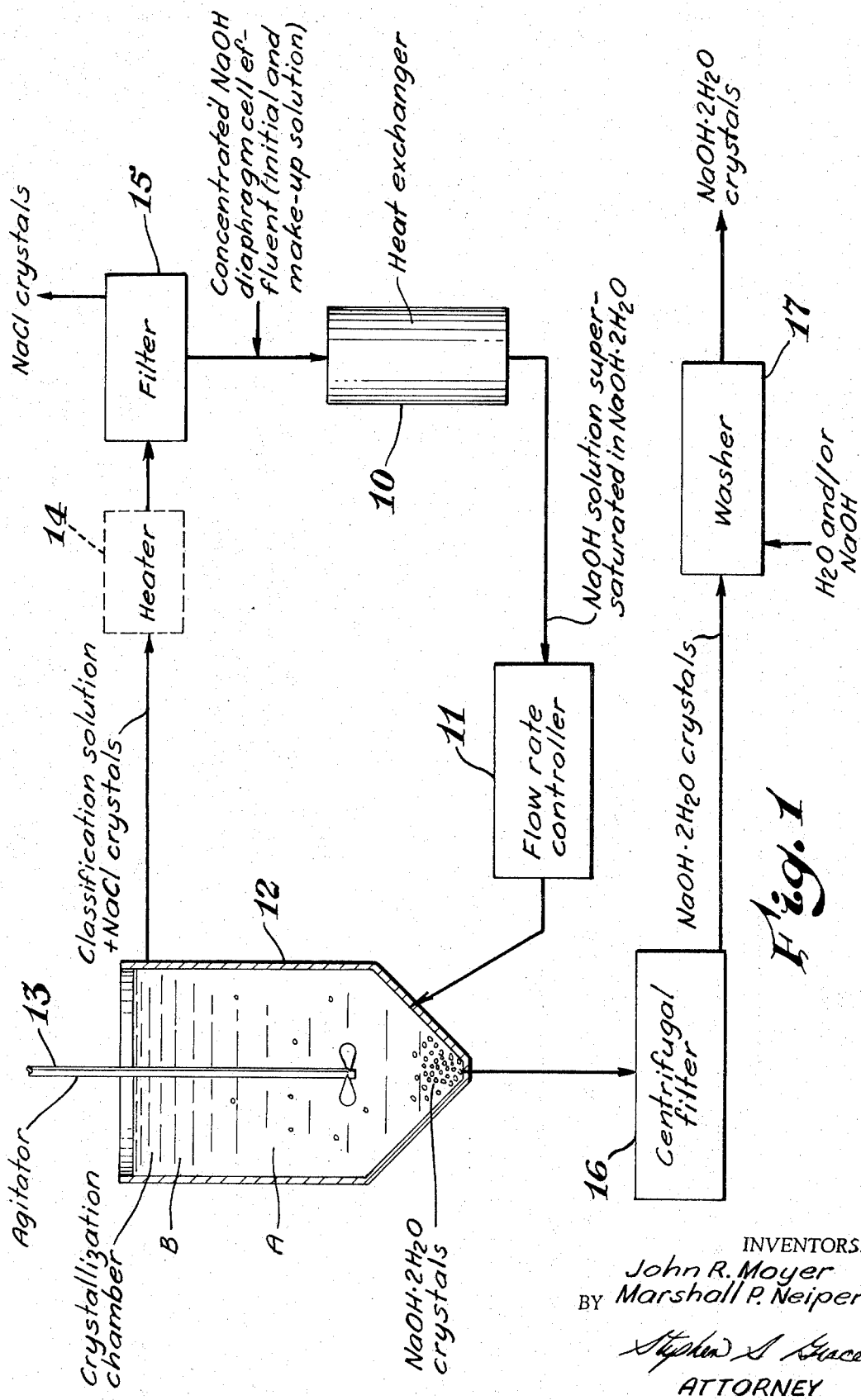
FIG. 1 is a flow diagram of one embodiment of such a process.

Referring to FIG. 1, the flow system comprises a heat exchanger 10; flow rate controller 11, e.g. a system of valves and pumps necessary to control the feed rate of the NaOH solution; crystallization chamber 12, e.g. cone-bottomed cylinder with mechanical agitator 13; optionally a heater 14 for melting NaOH·2H$_2$O fines; and filter 15 to remove impurity crystals prior to recycle through the heat exchanger. The crystallization chamber 12 is connected to centrifugal filter 16 and crystal washer 17.

In the practice of this preferred embodiment, diaphragm cell NaOH solution is concentrated to from 45 to 52 wt. percent NaOH, the concentration range which upon supercooling will produce NaOH·2H$_2$O. The solution contains at this point about 1–2% NaCl. The concentrated solution is fed into heat exchanger 10 and cooled to from about 5 to 12° C. The solution, now supersaturated with respect to NaOH·2H$_2$O, is fed into the crystallization zone A of the crystallization chamber 12 through a flow rate controller 11. The supersaturated solution contacts NaOH·2H$_2$O seed crystals in the crystallizer at a temperature of from 5 to 12° C. Under these conditions NaOH·2H$_2$O precipitates out of solution along with impurity crystals, primarily NaCl, forming a slurry. The slurry moves through a quiescent separation zone B of chamber 12, where due to the difference in settling rates the NaOH·2H$_2$O crystals settle back into the crystallization zone while the impurity crystals are carried through. Thus, as the solution moves through the chamber 12, it becomes depleted with respect to NaOH, impurities in solution and H$_2$O and is withdrawn from the crystallizer chamber.

The flow rate controller 11 feeds the supersaturated solution into and through chamber 12 at such a rate as to cause the smaller NaCl impurity crystals to be carried out with the depleted solution, but permitting the larger NaOH·2H$_2$O crystals to settle in the bottom of the crystallizer.

The depleted solution carrying the NaCl crystals is fed through filter 15 to remove solid materials. Make-up NaOH solution is added and the solution recycled. Such make-up solution can be added before or after filtration or even into the top of the crystallization chamber as the depleted solution is withdrawn.

In spite of precautions taken, NaOH·2H$_2$O crystal fines can be carried through with the depleted solution. Like the NaCl crystals, these fines should be removed prior to recycle through heat exchanger 10. While this can be done by filter 15, it is more efficiently accomplished by melting the fines by heater 14. It is necessary to heat the depleted solution only a few degrees centigrade in order to melt the NaOH·2H$_2$O fines.

The NaOH·2H$_2$O product crystals are withdrawn from the chamber and put through a centrifugal filter 16 to remove mother liquor. The mother liquor can be recycled into chamber 12. The NaOH·2H₂O crystals are washed to remove any adhering mother liquor in washer 17. We have found that a wash containing NaOH is superior to a water wash in removing adhering mother liquor.

The high purity NaOH·2H₂O crystals can then be melted down and diluted to produce 50% NaOH having an impurity content on the order of mercury cell grade NaOH. Alternatively the NaOH·2H₂O crystals can be calcined to produce high purity anhydrous caustic.

Figure 2:
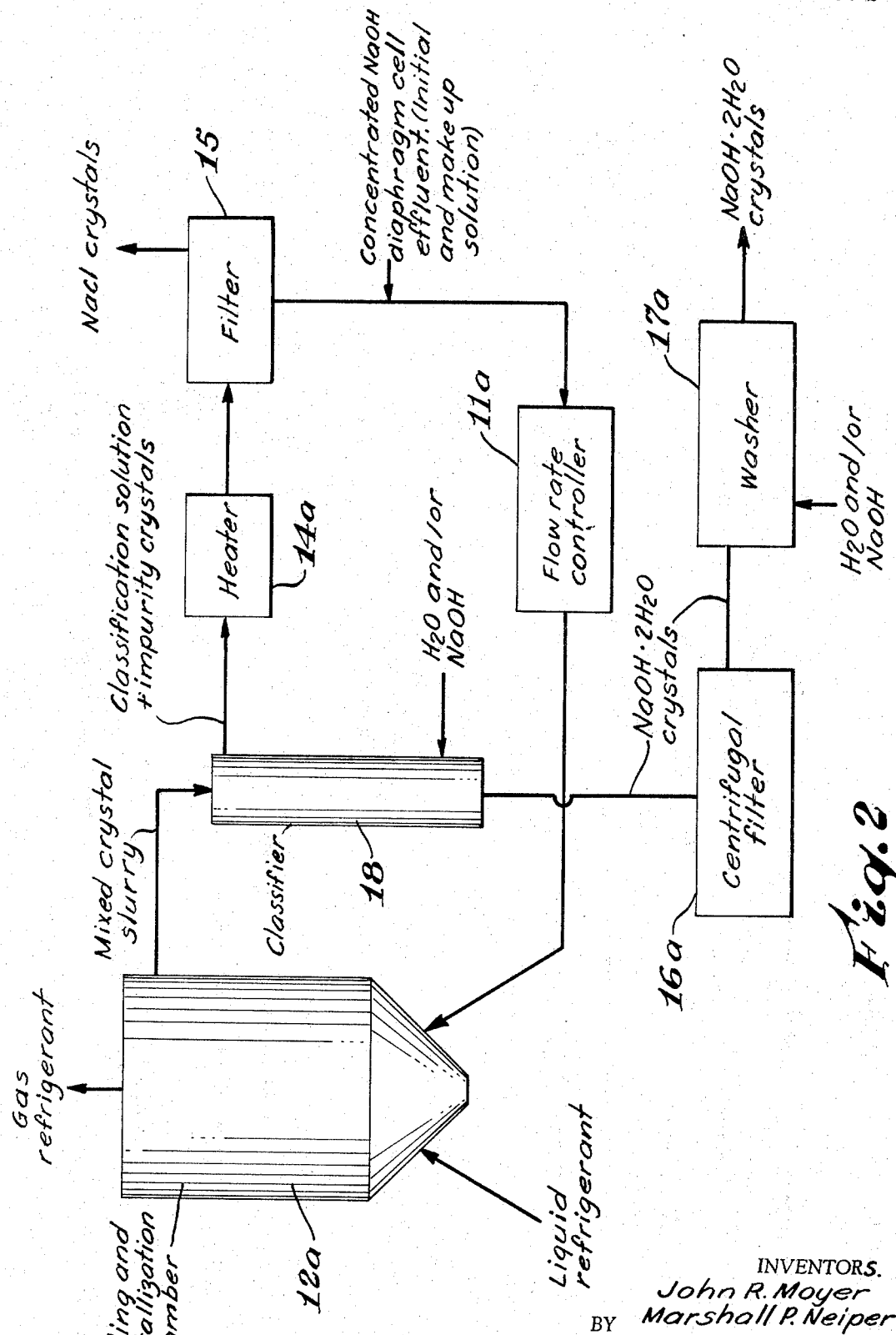
FIG. 2 is a flow diagram of a second embodiment of such a process.

FIG. 2 graphically presents a second means of carrying out the NaOH·2H₂O method described above. Numbers with the letter "a" are used where equipment items are equivalent in the two figures. The flow system comprises a flow rate controller 11a; cooling-crystallization chamber 12a, e.g. a draft tube, baffled crystallizer; a classification column 18; optionally a heater 14a; and filter 15a. The classification column is connected to centrifugal filter 16a and crystal washer 17a.

In the practice of this preferred embodiment, concentrated NaOH diaphragm cell effluent is fed into chamber 12a where it is cooled to supersaturation by contact with a liquid refrigerant. A slurry of NaOH·2H₂O and impurity crystals is formed in the chamber by contact of the supersaturated solution with seed crystals. The rate of NaOH solution entering the chamber is controlled by flow rate controller 12a such that substantially no settling of the crystals takes place. The mixed crystal slurry is withdrawn from the crystallizer and fed into the top of classifier 18, e.g. a countercurrent contact wash column. A classification solution of water or NaOH solution is fed into the bottom of classifier 18. The rates of feed for the slurry and classification solution are such that the impurity crystals are bouyed up or carried with the classification solution while the NaOH·2H₂O crystals settle to the bottom of the classifier. The classification solution containing the impurity crystals is removed from the classifier. (Instead of a single classification column a series of two or more could be employed.) Operation on the classification solution and the NaOH·2H₂O parallels the embodiment of FIG. 1.

The following examples serve to further illustrate the various aspects of the present invention.

EXAMPLE A

A concentrated diaphragm cell caustic solution containing 49.2% NaOH and 1.24% NaCl was super-cooled to 7.7° C. by passing the solution through water cooled, jacketed heat exchanger tubes. The supersaturated solution was fed into a cone-bottom, agitated crystallizer maintained at 7.7° C. and contacted with NaOH·2H₂O seed crystals. The NaOH·2H₂O crystals precipitated along with NaCl crystals. The depleted solution was withdrawn carrying with it the NaCl crystals. The depleted solution together with make-up NaOH solution was recycled to the heat exchanger. Note that this is not an embodiment of the present process since the depleted solution was not filtered to remove the NaCl crystals prior to recycle. The product NaOH·2H₂O crystals were removed from the crystallizer, centrifuged and washed with H₂O in an amount to equal 10% of the crystal weight. The washed crystals were melted and analyzed. The product contained 51.45% NaOH and 0.71% NaCl.

Example 1

The same procedure as Example A was repeated. This time a filter was included in the system to filter the depleted solution and remove the NaCl crystals prior to recycle. The product contained 50.2% NaOH and only 0.05% NaCl.

This example shows the necessity of the filtration step in the present process. Continual removal of the impurity crystals from the crystallizer is an essential step in producing high purity NaOH. The product NaOH·2H₂O crystals will not have adhering solid NaCl, which is difficult to remove, but only adhering mother liquor containing dissolved impurities which can be removed more easily.

Example 2

Another reason for removing the solid impurities from the depleted solution prior to recycle is to reduce or eliminate fouling of the heat exchanger. The solids, particularly the fine crystals of NaOH hydrate, if allowed into the heat exchanger tubes, will act as nucleation sites for crystal formation upon super-cooling. The tubes would soon become plugged with NaOH hydrate crystals.

The filtered solution of Example 1 was circulated through a heat exchanger of about 24 feet of ½ inch diameter stainless steel pipe which was jacketed to permit counterflow circulation of cold water. The super-cooled solution was fed back into crystallizer. The system was run continuously for 5 days without significant fouling or plugging of the heat exchanger tubing.

In many similar experiments, but without filtering the depleted solution, the heat exchanger tubes become plugged with NaOH·2H₂O within 4 hours.

Example 3

Some of the product NaOH·2H₂O crystals produced in Example 1 were washed with 46% NaOH solution instead of H₂O. Equivalent amounts of wash solution were employed. The NaOH-washed crystals were melted and analyzed. The product contained 51.95% NaOH and only 0.0035% NaCl.

This example shows the improvement of using an NaOH wash solution. Apparently the NaOH solution is more effective in removing the adhering mother liquor.

We claim:

1. A method which comprises:
  (a) cooling a NaOH solution containing a soluble impurity to a temperature where said solution is super-saturated with respect to a NaOH hydrate;
  (b) forming from the supersaturated solution a slurry of large NaOH hydrate and fine impurity crystals;
  (c) separating the fine impurity crystals from the large NaOH hydrate crystals by countercurrently contacting the slurry with a classifying solution such that the fine impurity crystals are carried with the classifying solution while the large, faster settling, NaOH hydrate crystals settle to form a crystal bed;
  (d) separating the classifying solution containing the fine impurity crystals from the NaOH hydrate crystals;
  (e) removing the fine impurity crystals from the classifying solution;
  (f) adding NaOH solution to the classifying solution and recycling for cooling in step (a);
  (g) removing at least a portion of the NaOH hydrate crystals from the bed; and
  (h) washing the NaOH hydrate crystals.

2. The method of claim 1 including the additional step of heating the classifying solution prior to step (f) to melt any NaOH hydrate crystal fines that remain in the solution.

3. The method of claim 1 wherein the supersaturated solution is agitated during the formation of the slurry.

4. The method of claim 1 wherein the NaOH hydrate crystals are washed with a NaOH solution.

5. The method of claim 1 wherein steps (b) and (c) are carried out in a single chamber and the super-saturated solution serves as the classification solution.

6. The method of claim 1 wherein the NaOH solution is cooled by contact with a liquid refrigerant.

7. The method of claim 1 wherein there is substantially no settling of the slurry prior to step (c).

8. The method of claim 1 wherein the supersaturated solution is agitated during formation of the slurry and the NaOH hydrate crystals are washed with a NaOH solution.

9. The method of claim 8 wherein steps (b) and (c) are carried out in a single chamber and the supersaturated solution serves as the classification solution.

10. The method of claim 9 wherein impurity crystals are removed from the classifying solution by filtering the classifying solution.

11. The method of claim 9 wherein the NaOH solution contains from 45 to 52 weight percent NaOH and about 1 to about 2 weight percent NaCl.

12. The method of claim 11 wherein the NaOH solution of step (a) is cooled to from about 5 to about 12° C.

13. The method of claim 1 wherein the NaOH solution of step (a) contains from 45 to 52 weight percent NaOH and about 1 to 2 weight percent NaCl.

14. The method of claim 13 wherein the NaOH solution of step (a) is cooled to from about 5 to about 12° C.

15. The method of claim 1 wherein impurity crystals are removed from the classifying solution by filtering the classifying solution.

16. The method of claim 15 wherein sodium chloride impurity crystals are removed by filtering.

References Cited

UNITED STATES PATENTS

| | | | |
|---|---|---|---|
| 3,477,829 | 11/1969 | Dockendorff et al. | 23—302 |
| 2,127,496 | 8/1938 | Waldeck | 423—641 |
| 1,733,879 | 10/1929 | Hooker et al. | 423—641 |
| 2,178,694 | 11/1939 | Muskat et al. | 23—302 |

NORMAN YUDKOFF, Primary Examiner

U.S. Cl. X.R.

423—179, 641